United States Patent
Bae et al.

(10) Patent No.: US 12,333,979 B2
(45) Date of Patent: Jun. 17, 2025

(54) TRANSCEIVER, ELECTRONIC DEVICE, AND DRIVER

(71) Applicant: SAMSUNG DISPLAY CO., LTD., Yongin-si (KR)

(72) Inventors: Jongman Bae, Yongin-si (KR); Jundal Kim, Yongin-si (KR); Hyunsu Kim, Yongin-si (KR); Kyungyoul Min, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/454,394

(22) Filed: Aug. 23, 2023

(65) Prior Publication Data

US 2024/0071273 A1 Feb. 29, 2024

(30) Foreign Application Priority Data

Aug. 24, 2022 (KR) .................. 10-2022-0106104

(51) Int. Cl.
*G09G 3/20* (2006.01)
*G06F 3/041* (2006.01)

(52) U.S. Cl.
CPC ............. *G09G 3/20* (2013.01); *G06F 3/0412* (2013.01); *G06F 3/0416* (2013.01); *G09G 2340/0435* (2013.01); *G09G 2354/00* (2013.01); *G09G 2370/10* (2013.01)

(58) Field of Classification Search
CPC ............. G09G 3/20; G09G 2340/0435; G09G 2354/00; G09G 2370/10; G09G 3/2096; G09G 5/006; G06F 3/0412; G06F 3/0416; H04N 21/4363; H04N 21/41407; H04N 21/43076; H04N 21/43615
See application file for complete search history.

(56) References Cited

U.S. PATENT DOCUMENTS

| | | | |
|---|---|---|---|
| 11,238,779 B1* | 2/2022 | Maruyama | G09G 3/3275 |
| 2020/0082760 A1* | 3/2020 | Ogata | G09G 3/3258 |
| 2021/0248957 A1* | 8/2021 | Lee | G09G 3/3225 |

FOREIGN PATENT DOCUMENTS

KR 10-2021-0142761 11/2021

* cited by examiner

*Primary Examiner* — Amit Chatly
(74) *Attorney, Agent, or Firm* — F. CHAU & ASSOCIATES, LLC

(57) ABSTRACT

A transceiver includes a transmitter which transmits frame data through a first interface during a frame period including a vertical back porch period, a vertical active period, a vertical front porch period, and a variable vertical front porch period, and a receiver connected to the transmitter through the first interface and a second interface. The receiver transmits a start pulse of a synchronization signal to the transmitter through the second interface before starting transmission of the frame data. The transmitter transmits synchronization pulses of the synchronization signal to the receiver through the second interface during the variable vertical front porch period.

18 Claims, 6 Drawing Sheets

VPCH:VFP, ΔVFP, VBP

TRANSCEIVER, ELECTRONIC DEVICE, AND DRIVER

CROSS-REFERENCE TO RELATED APPLICATION(S)

This application claims priority under 35 U.S.C. § 119 to Korean Patent Application No. 10-2022-0106104, filed on Aug. 24, 2022 in the Korean Intellectual Property Office (KIPO), the disclosure of which is incorporated by reference herein in its entirety.

TECHNICAL FIELD

Embodiments of the present disclosure relate to a transceiver. More particularly, embodiments of the present disclosure relate to a transceiver, an electronic device including the transceiver, and a driver including a receiver.

DISCUSSION OF RELATED ART

The Mobile Industry Processor Interface (MIPI) is a standard interface for portable electronic devices. The MIPI supports two display modes: a video mode and a command mode. In the video mode, image data may be transmitted from a transmitter to a receiver in real time. In the video mode, the transmitter and the receiver may be synchronized through a synchronization signal transmitted from the transmitter to the receiver according to a MIPI protocol during a frame period including a vertical active period and a vertical porch period.

A display device included in an electronic device may operate in a variable frame frequency method. A length of the frame period may change according to a change in a frame frequency, and a length of the vertical porch period may change while maintaining a length of the vertical active period. The vertical porch period may include a variable vertical front porch period, and the length of the frame period may change according to a change in length of the variable vertical front porch period.

SUMMARY

Embodiments of the present disclosure provide a transceiver in which a transmitter and a receiver are synchronized in a variable frame frequency method.

Embodiments of the present disclosure provide an electronic device in which a host and a driver are synchronized in a variable frame frequency method.

Embodiments of the present disclosure provide a driver including a receiver that is synchronized with a transmitter in a variable frame frequency method.

A transceiver according to embodiments may include a transmitter which transmits frame data through a first interface during a frame period including a vertical back porch period, a vertical active period, a vertical front porch period, and a variable vertical front porch period, and a receiver connected to the transmitter through the first interface and a second interface. The receiver may transmit a start pulse of a synchronization signal to the transmitter through the second interface before starting transmission of the frame data. The transmitter may transmit synchronization pulses of the synchronization signal to the receiver through the second interface during the variable vertical front porch period.

In an embodiment, the synchronization pulses may be transmitted at intervals of one horizontal time.

In an embodiment, the frame data may include a horizontal synchronization packet transmitted during the vertical back porch period, the vertical active period, and the vertical front porch period, and corresponding to a horizontal synchronization signal.

In an embodiment, a transmission subject of the synchronization signal may be switched from the receiver to the transmitter when the horizontal synchronization packet is not transmitted during predetermined horizontal times after a start of the variable vertical front porch period.

In an embodiment, the transmitter and the receiver may count a number of the synchronization pulses transmitted during the variable vertical front porch period. A transmission subject of the synchronization signal may be switched from the transmitter to the receiver based on the counted number of the synchronization pulses.

In an embodiment, the transmitter may transmit the frame data in response to the start pulse of the synchronization signal.

In an embodiment, the transmitter may transmit a transition pattern of the synchronization signal instead of the synchronization pulses when a touch interrupt occurs during the variable vertical front porch period. A transmission subject of the synchronization signal may be switched from the transmitter to the receiver in response to the transition pattern.

In an embodiment, the first interface may be a Mobile Industry Processor Interface (MIPI). The second interface may be different from the first interface.

An electronic device according to embodiments may include a host which transmits frame data through a first interface during a frame period including a vertical back porch period, a vertical active period, a vertical front porch period, and a variable vertical front porch period, a driver connected to the host through the first interface and a second interface, and which transmits image data, and a display device which displays an image based on the image data. The driver may transmit a start pulse of a synchronization signal to the host through the second interface before starting transmission of the frame data. The host may transmit synchronization pulses of the synchronization signal to the driver through the second interface during the variable vertical front porch period.

In an embodiment, the synchronization pulses may be transmitted at intervals of one horizontal time.

In an embodiment, the frame data may include a horizontal synchronization packet transmitted during the vertical back porch period, the vertical active period, and the vertical front porch period, and corresponding to a horizontal synchronization signal.

In an embodiment, a transmission subject of the synchronization signal may be switched from the driver to the host when the horizontal synchronization packet is not transmitted during predetermined horizontal times after a start of the variable vertical front porch period.

In an embodiment, the host and the driver may count a number of the synchronization pulses transmitted during the variable vertical front porch period. A transmission subject of the synchronization signal may be switched from the host to the driver based on the counted number of the synchronization pulses.

In an embodiment, the host may transmit the frame data in response to the start pulse of the synchronization signal.

In an embodiment, the electronic device may further include a touch device connected to the host, and which generates a touch interrupt in response to a touch of a user. The host may transmit a transition pattern of the synchronization signal instead of the synchronization pulses when the touch interrupt occurs during the variable vertical front porch period. A transmission subject of the synchronization signal may be switched from the host to the driver in response to the transition pattern.

In an embodiment, the first interface may be a Mobile Industry Processor Interface (MIPI). The second interface may be different from the first interface.

In an embodiment, the display device may display the image during the vertical active period, and does not display the image during the vertical back porch period, the vertical front porch period, and the variable vertical front porch period.

In an embodiment, a length of the variable vertical front porch period may increase or decrease in response to a change in a frame frequency of the display device.

In an embodiment, the frame data may include a command packet transmitted during the vertical back porch period and the vertical front porch period, and including information related to the frame frequency.

A driver according to embodiments may include a receiver connected to a transmitter through a first interface and a second interface, and which receives frame data from the transmitter through the first interface during a frame period including a vertical back porch period, a vertical active period, a vertical front porch period, and a variable vertical front porch period. The receiver may transmit a start pulse of a synchronization signal to the transmitter through the second interface before starting transmission of the frame data. The receiver may receive synchronization pulses of the synchronization signal from the transmitter through the second interface during the variable vertical front porch period.

In the transceiver, the electronic device, and the driver according to embodiments, the transmitter (or host) may transmit the synchronization pulses of the synchronization signal to the receiver (or driver) during the variable vertical front porch period. As a result, the transmitter (or host) and the receiver (or driver) may be synchronized in the variable frame frequency method.

BRIEF DESCRIPTION OF THE DRAWINGS

Illustrative, non-limiting embodiments will be more clearly understood from the following detailed description taken in conjunction with the accompanying drawings.

DETAILED DESCRIPTION OF THE EMBODIMENTS

Figure 1:
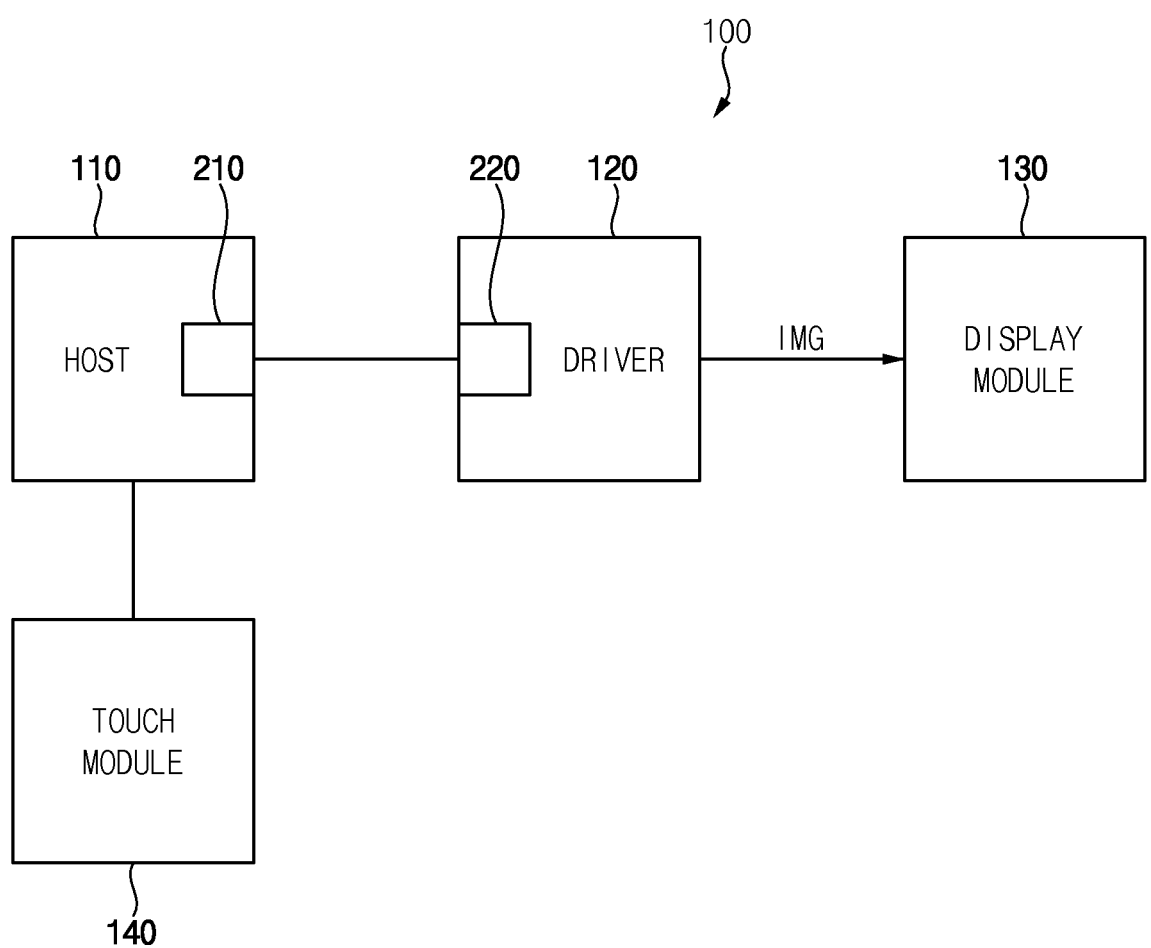
FIG. 1 is a block diagram illustrating an electronic device according to an embodiment.

Hereinafter, an electronic device, a transceiver, and a driver according to embodiments of the present disclosure will be described in more detail with reference to the accompanying drawings. The same or similar reference numerals may be used for the same or similar elements in the accompanying drawings.

It will be understood that the terms "first," "second," "third," etc. are used herein to distinguish one element from another, and the elements are not limited by these terms. Thus, a "first" element in an embodiment may be described as a "second" element in another embodiment.

It should be understood that descriptions of features or aspects within each embodiment should typically be considered as available for other similar features or aspects in other embodiments, unless the context clearly indicates otherwise.

As used herein, the singular forms "a", "an" and "the" are intended to include the plural forms as well, unless the context clearly indicates otherwise.

Herein, when two or more elements or values are described as being substantially the same as or about equal to each other, it is to be understood that the elements or values are identical to each other, the elements or values are equal to each other within a measurement error, or if measurably unequal, are close enough in value to be functionally equal to each other as would be understood by a person having ordinary skill in the art. For example, the term "about" as used herein is inclusive of the stated value and means within an acceptable range of deviation for the particular value as determined by one of ordinary skill in the art, considering the measurement in question and the error associated with measurement of the particular quantity (e.g., the limitations of the measurement system). For example, "about" may mean within one or more standard deviations as understood by one of the ordinary skill in the art. Further, it is to be understood that parameters may be described herein as having "about" a certain value, according to embodiments, the parameter may be exactly the certain value or approximately the certain value within a measurement error as would be understood by a person having ordinary skill in the art.

FIG. 1 is a block diagram illustrating an electronic device 100 according to an embodiment.

Referring to FIG. 1, an electronic device 100 may include a host 110, a driver 120, a display device 130, and a touch device 140. The electronic device 100 may be a device capable of displaying video streams (e.g., a still image, a moving image, etc.) using the display device 130.

In an embodiment, the electronic device 100 may be one, for example, of a smartphone, a tablet PC, a mobile phone, a video phone, an e-book reader, a desktop PC, a laptop PC, a netbook computer, a workstation, a server, a PDA, a portable multimedia player (PMP), an MP3 player, a medical device, a camera, and a wearable device. In an embodiment, the electronic device 100 may be one of, for example, a television, a digital video disk (DVD) player, an audio system, a refrigerator, an air conditioner, a vacuum cleaner, an oven, a microwave oven, a washing machine, an air purifier, a set top box, a home automation control panel, a security control panel, a media box, a game console, an electronic dictionary, an electronic key, a camcorder, and an electronic photo frame. In an embodiment, the electronic device 100 may be one of, for example, a medical device, a navigation device, a global navigation satellite system (GNSS), an event data recorder (EDR), a flight data recorder (FDR), an automobile infotainment device, a marine electronic device, avionics, a security device, an automotive head unit, an industrial or domestic robot, a drone, an ATM in a financial institution, a point of sales (POS) device in a store, and an Internet of Things (IoT) device.

The host 110 may control an operation of the driver 120. In an embodiment, the host 110 may be implemented as, for example, an integrated circuit, a system on chip (SoC), an application processor (AP), a mobile AP, or the like. The host 110 may include a transmitter 210.

The driver 120 may control an operation of the display device 130, and may transmit image data IMG to the display device 130. In an embodiment, the driver 120 may be implemented as, for example, a Timing-controller Embedded Driver (TED) or the like. The driver 120 may include a receiver 220.

The display device 130 may display an image based on the image data IMG. In an embodiment, the display device 130 may be implemented as, for example, an organic light emitting diode (OLED) display device, a liquid crystal display (LCD) device, a quantum dot light emitting diode (QLED) display device, or the like.

The touch device 140 may detect a touch of a user, and may be connected to the host 110. The touch device 140 may generate a touch interrupt in response to the touch of the user, and may transmit the touch interrupt to the host 110. In an embodiment, the touch device 140 is not connected to the driver 120. In an embodiment, the touch device 140 may be implemented as, for example, a capacitive touch device, a resistive touch device, an infrared touch device, an ultrasonic touch device, or the like.

Figure 2:
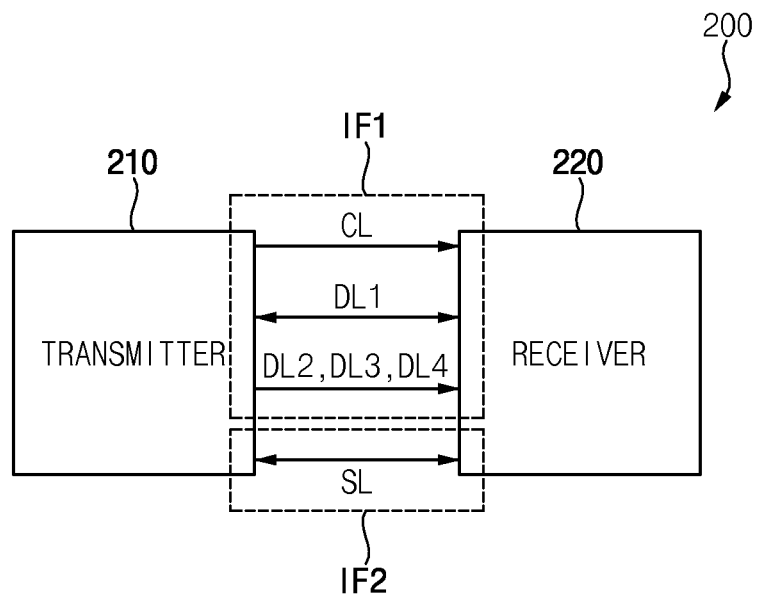
FIG. 2 is a block diagram illustrating a transceiver according to an embodiment.

FIG. 2 is a block diagram illustrating a transceiver 200 according to an embodiment.

Referring to FIG. 2, the transceiver 200 may include the transmitter 210 and the receiver 220. The transmitter 210 may be included in the host 110, and the receiver 220 may be included in the driver 120.

The transmitter 210 and the receiver 220 may be connected through a first interface IF1. The transmitter 210 and the receiver 220 may communicate with each other through the first interface IF1. In an embodiment, the first interface IF1 may be, for example, a Mobile Industry Processor Interface (MIPI). The first interface IF1 may include one clock lane CL and at least one data lane. In an embodiment, the first interface IF1 may include first to fourth data lanes DL1 to DL4.

The clock lane CL may be a unidirectional transmission line. The clock lane CL may transmit clock signals having different frequencies and swing levels according to an operation mode (e.g., a low-power mode, a high-speed mode, etc.) from the transmitter 210 to the receiver 220.

The first data lane DL1 may be a bi-directional transmission line. The first data lane DL1 may transmit data having different frequencies and swing levels according to the operation mode from the transmitter 210 to the receiver 220 or from the receiver 220 to the transmitter 210. Each of the second to fourth data lanes DL2 to DL4 may be a unidirectional transmission line. Each of the second to fourth data lanes DL2 to DL4 may transmit data having different frequencies and swing levels according to the operation mode from the transmitter 210 to the receiver 220.

The first interface IF1 may support a video mode and a command mode. In the video mode, the image data IMG may be transmitted from the transmitter 210 to the receiver 220 in real time. In the command mode, the image data IMG may be transmitted from the transmitter 210 to the receiver 220 according to a request of the receiver 220, and the receiver 220 may store the image data IMG.

The transmitter 210 and the receiver 220 may be connected through a second interface IF2. The transmitter 210 and the receiver 220 may communicate with each other through the second interface IF2. The second interface IF2 may be an interface different from the first interface IF1. For example, the second interface IF2 may be independent of the first interface IF1. In an embodiment, the second interface IF2 does not conform to a MIPI standard. The second interface IF2 may include one synchronization lane SL.

The synchronization lane SL may be a bi-directional transmission line. The synchronization lane SL may transmit a synchronization signal V_TE (see FIG. 4) from the transmitter 210 to the receiver 220 or from the receiver 220 to the transmitter 210.

Figure 3:
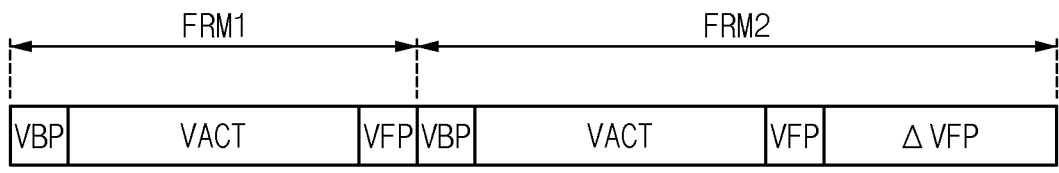
FIG. 3 is a diagram illustrating frame periods according to an embodiment.

FIG. 3 is a diagram illustrating frame periods FRM1 and FRM2 according to an embodiment. FIG. 3 illustrates a first frame period FRM1 corresponding to a maximum frame frequency and a second frame period FRM2 corresponding to a frame frequency lower than the maximum frame frequency.

Referring to FIG. 3, a frame period may include a vertical active period VACT and a vertical porch period VPCH. One frame period may correspond to one image frame. In an embodiment, the display device 130 may display an image during the vertical active period VACT, and does not display an image during the vertical porch period VPCH.

The vertical porch period VPCH may include a vertical front porch period VFP and a vertical back porch period VBP. The vertical front porch period VFP may follow the vertical active period VACT, and the vertical back porch period VBP may precede the vertical active period VACT.

The display device 130 may operate in a variable frame frequency (or variable refresh rate, VRR) method in which the frame frequency may change. A length of the frame period may increase when the frame frequency decreases, and the length of the frame period may decrease when the frame frequency increases. In an embodiment, as illustrated in FIG. 3, the display device 130 may operate at the maximum frame frequency in the first frame period FRM1, and may operate at a frame frequency lower than the maximum frame frequency in the second frame period FRM2.

The frame period may further include a variable vertical front porch period AVFP for changing the frame frequency. The variable vertical front porch period AVFP may follow the vertical front porch period VFP. The display device 130 may change the frame frequency by adjusting a length of the variable vertical front porch period AVFP. In an embodiment, when the display device 130 operates at the maximum frame frequency, the frame period does not include the variable vertical front porch period AVFP, and when the display device 130 operates at a frame frequency lower than the maximum frame frequency, the frame period may include the variable vertical front porch period AVFP. The frame frequency may decrease when the length of the variable vertical front porch period AVFP increases, and the frame frequency may increase when the length of the variable vertical front porch period AVFP decreases.

Figure 4:
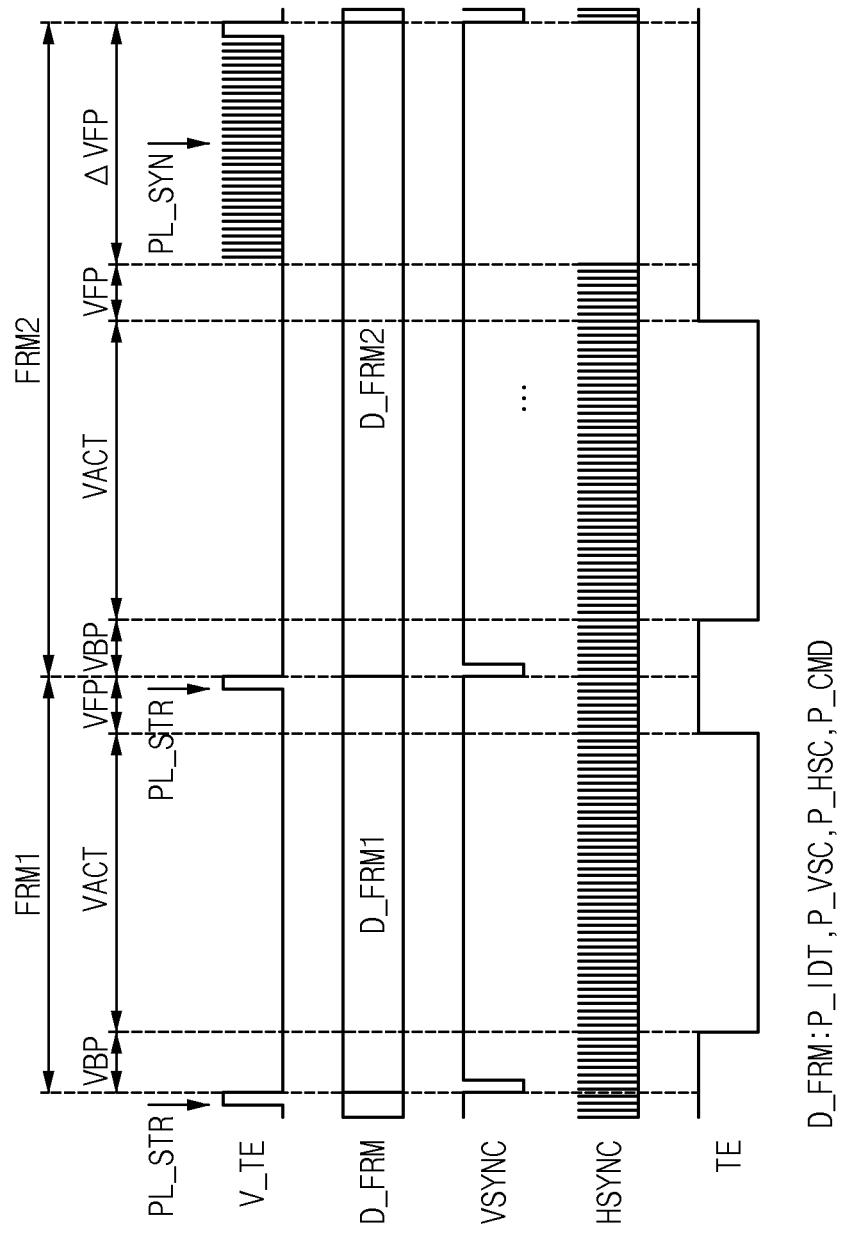
FIG. 4 is a diagram illustrating signals transmitted during frame periods according to an embodiment.

FIG. 4 is a diagram illustrating signals transmitted during the frame periods FRM1 and FRM2 according to an embodiment.

Referring to FIG. 4, the transmitter 210 may transmit frame data D_FRM to the receiver 220 through the first interface IF1 during the frame period. The transmitter 210 may transmit the frame data D_FRM to the receiver 220 through the first to fourth data lanes DL1 to DL4. The transmitter 210 may transmit first frame data D_FRM1 to the receiver 220 during the first frame period FRM1, and may transmit second frame data D_FRM2 to the receiver 220 during the second frame period FRM2.

The frame data D_FRM may include a video data packet P IDT, a vertical synchronization packet P_VSC, a horizontal synchronization packet P_HSC, and a command packet P CMD. The image data packet P IDT may include the image data IMG, and may be transmitted during the vertical active period VACT.

The vertical synchronization packet P_VSC may correspond to a vertical synchronization signal VSYNC, and may be transmitted during the vertical back porch period VBP. For example, a time from one falling edge to next falling edge of the vertical synchronization signal VSYNC may be defined as one frame period.

The horizontal synchronization packet P_HSC may correspond to a horizontal synchronization signal HSYNC, and may be transmitted during the vertical back porch period VBP, the vertical active period VACT, and the vertical front porch period VFP. For example, a time from one rising edge to the next rising edge of the horizontal synchronization signal HSYNC may be defined as one horizontal time (1H).

The command packet P CMD may include information related to the frame frequency, and may be transmitted during the vertical back porch period VBP and the vertical front porch period VFP. In an embodiment, the information related to the frame frequency included in the command packet P CMD transmitted during the current frame period may be applied to the next frame period. For example, the command packet P CMD transmitted during the first frame period FRM1 may include information related to the frame frequency corresponding to the second frame period FRM2.

The tearing effect (TE) signal TE may be an internal signal of the driver 120. For example, the TE signal may have a logic high voltage during the vertical porch period VPCH and a logic low voltage during the vertical active period VACT.

The receiver 220 may transmit a start pulse PL_STR of the synchronization signal V_TE to the transmitter 210 through the second interface IF2 before starting transmission of the frame data D_FRM. The transmitter 210 may transmit the frame data D_FRM in response to the start pulse PL_STR of the synchronization signal V_TE. For example, the transmitter 210 may start transmitting the frame data D_FRM at the time when the falling edge of the start pulse PL_STR of the synchronization signal V_TE is generated. The receiver 220 may control a period of the start pulse PL_STR of the synchronization signal V_TE using the information related to the frame frequency included in the command packet P CMD.

As described above, the transmitter 210 may transmit the vertical synchronization packet P_VSC to the receiver 220 through the first interface IF1 during the vertical back porch period VBP, and may transmit the horizontal synchronization packet P_HSC through the first interface IF1 during the vertical back porch period VBP, the vertical active period VACT, and the vertical front porch period VFP. The transmitter 210 and the receiver 220 may be synchronized by the vertical synchronization signal VSYNC and the horizontal synchronization signal HSYNC during the vertical back porch period VBP, the vertical active period VACT, and the vertical front porch period VFP.

The transmitter 210 may transmit synchronization pulses PL_SYN of the synchronization signal V_TE to the receiver 220 through the second interface IF2 during the variable vertical front porch period ΔVFP. The transmitter 210 and the receiver 220 may be synchronized by the synchronization pulses PL_SYN of the synchronization signal V_TE during the variable vertical front porch period ΔVFP.

In the video mode of MIPI, since the image data IMG is transmitted from the transmitter 210 to the receiver 220 in real time without storing the image data IMG, the transmitter 210 and the receiver 220 may be continuously synchronized. The transmitter 210 and the receiver 220 may be synchronized by the vertical synchronization signal VSYNC and the horizontal synchronization signal HSYNC during the vertical back porch period VBP, the vertical active period VACT, and the vertical front porch period VFP, and may be synchronized by the synchronization pulses PL_SYN of the synchronization signal V_TE during the variable vertical front porch period ΔVFP, so that the transmitter 210 and the receiver 220 may be continuously synchronized.

Figure 5:
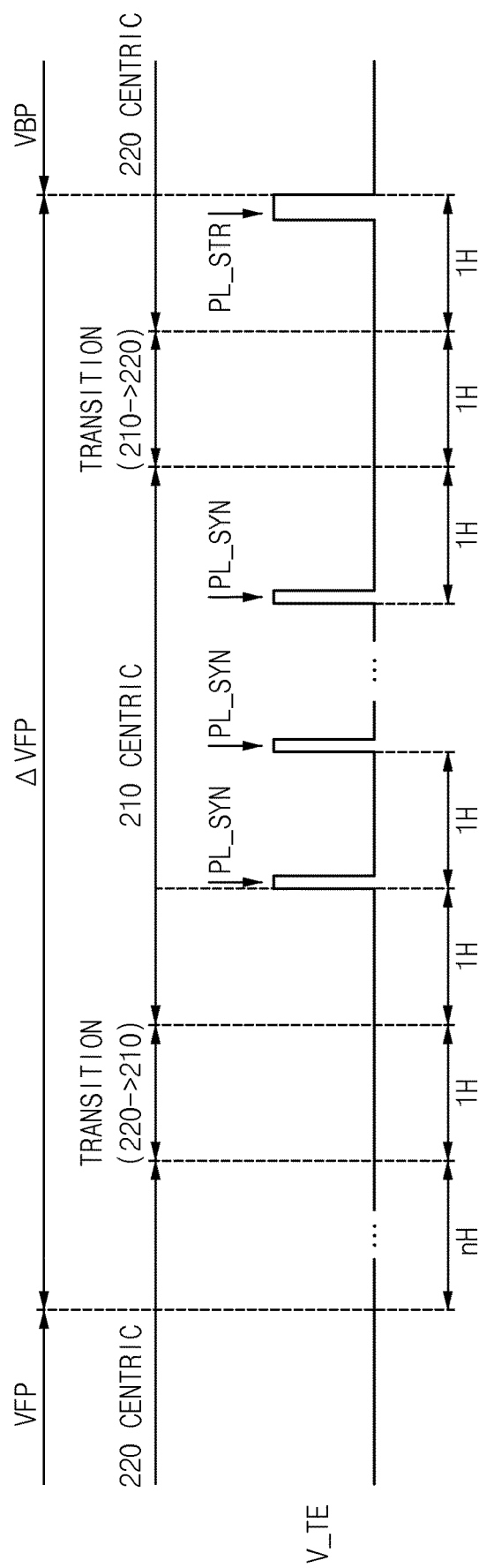
FIG. 5 is a diagram illustrating a synchronization signal according to an embodiment.

FIG. 5 is a diagram illustrating the synchronization signal V_TE according to an embodiment. For example, FIG. 5 may illustrate the vertical front porch period VFP and the variable vertical front porch period ΔVFP of the second frame period FRM2 in FIG. 4.

Referring to FIG. 5, a transmission subject of the synchronization signal V_TE during the vertical front porch period VFP may be the receiver 220. The horizontal synchronization packet P_HSC may be transmitted from the transmitter 210 to the receiver 220 during the vertical front porch period VFP.

In an embodiment, the horizontal synchronization packet P_HSC is not transmitted from the transmitter 210 to the receiver 220 during the variable vertical front porch period ΔVFP. When the horizontal synchronization packet P_HSC is not transmitted during predetermined horizontal times nH (where n is a natural number greater than or equal to 2) after the start of the variable vertical front porch period ΔVFP, the transmission subject of the synchronization signal V_TE may be switched from the receiver 220 to the transmitter 210. In an embodiment, the predetermined horizontal times nH may be stored in a register included in each of the transmitter 210 and the receiver 220. In an embodiment, a time utilized for the transmission subject of the synchronization signal V_TE to switch from the receiver 220 to the transmitter 210 may be one horizontal time (1H).

After the transmission subject of the synchronization signal V_TE is switched from the receiver 220 to the transmitter 210, during the variable vertical front porch period ΔVFP, the transmitter 210 may transmit the synchronization pulses PL_SYN of the synchronization signal V_TE to the receiver 220. In an embodiment, the synchronization pulses PL_SYN may be transmitted at intervals of one horizontal time (1H). In other words, an interval between one synchronization pulse PL_SYN and the next synchronization pulse PL_SYN may be one horizontal time (1H). In an embodiment, widths of the synchronization pulses PL_SYN may be about equal to each other.

The transmitter 210 and the receiver 220 may count the number of synchronization pulses PL_SYN transmitted during the variable vertical front porch period ΔVFP. The transmission subject of the synchronization signal V_TE may be switched from the transmitter 210 to the receiver 220 based on the counted number of synchronization pulses PL_SYN. The transmitter 210 and the receiver 220 may calculate horizontal times corresponding to the variable vertical front porch period ΔVFP using, for example, information related to the frame frequency, resolution of the display device 130, or the like, and may calculate an end time point of the variable vertical front porch period ΔVFP based on the counted synchronization pulses PL_SYN. Accordingly, the transmission subject of the synchronization signal V_TE may be switched from the transmitter 210 to the receiver 220 immediately before the end of the variable vertical front porch period ΔVFP. In an embodiment, each of the transmitter 210 and the receiver 220 may include a counter that counts the number of synchronization pulses PL_SYN transmitted during the variable vertical front porch period ΔVFP. In an embodiment, a time utilized for the transmission subject of the synchronization signal V_TE to switch from the transmitter 210 to the receiver 220 may be one horizontal time (1H).

After the transmission subject of the synchronization signal V_TE is switched from the transmitter 210 to the receiver 220, the receiver 220 may transmit the start pulse PL_STR of the synchronization signal V_TE to the transmitter 210 immediately before the start of the vertical back porch period VBP. In an embodiment, a width of the start pulse PL_STR may be greater than a width of each of the synchronization pulses PL_SYN.

Figure 6:
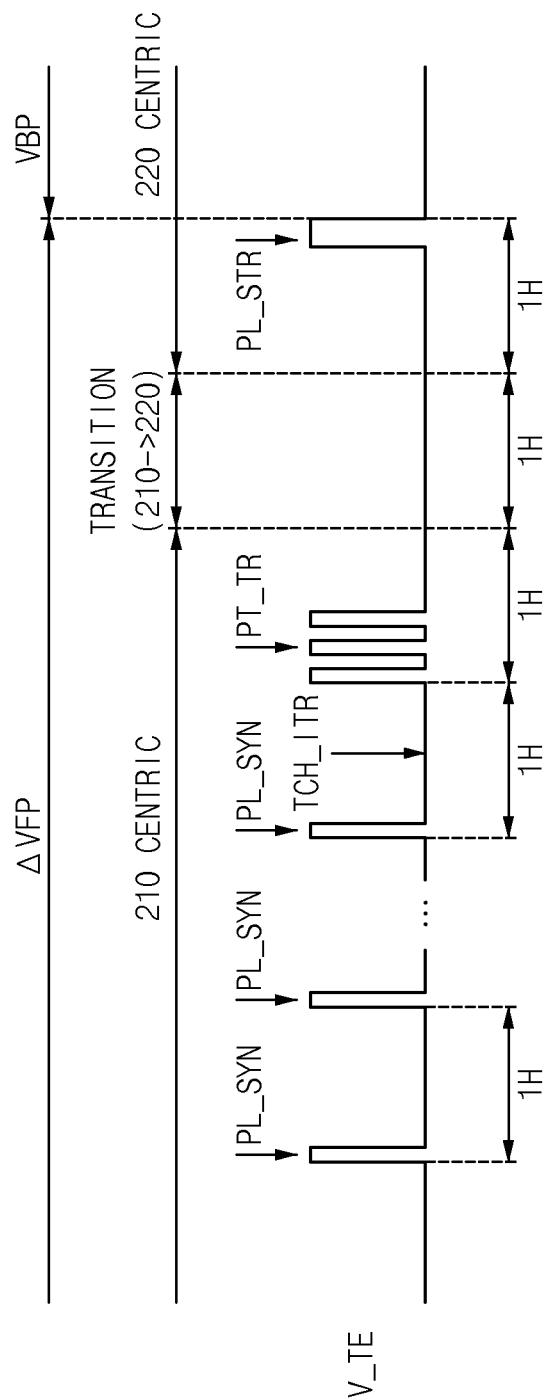
FIG. 6 is a diagram illustrating a synchronization signal when a touch interrupt occurs according to an embodiment.

FIG. 6 is a diagram illustrating the synchronization signal V_TE when a touch interrupt TCH_ITR occurs according to an embodiment.

Referring to FIG. 6, when the touch interrupt TCH_ITR occurs during the variable vertical front porch period ΔVFP, the transmitter 210 may stop transmitting the synchronization pulses PL_SYN, and may transmit a transition pattern PT_TR of the synchronization signal V_TE instead of the synchronization pulses PL_SYN. The image data IMG may be updated when a touch of a user occurs, and the next frame period may be started to update the image data IMG. Since the touch device 140 is connected to the host 110 and not connected to the driver 120, the transmitter 210 may transmit the transition pattern PT_TR of the synchronization signal V_TE to the receiver 220 to switch the transmission subject of the synchronization signal V_TE from the transmitter 210 to the receiver 220 when the touch interrupt TCH_ITR occurs.

A shape of the transition pattern PT_TR may be different from that of the synchronization pulse PL_SYN. FIG. 6 illustrates that the transition pattern PT_TR includes three adjacent pulses. However, embodiments of the present disclosure are not limited thereto. For example, in an embodiment, the transition pattern PT_TR may have various shapes different from that of the synchronization pulse PL_SYN.

After the transition pattern PT_TR is transmitted, the transmission subject of the synchronization signal V_TE may be switched from the transmitter 210 to the receiver 220 in response to the transition pattern PT_TR. In an embodiment, a time utilized for the transmission subject of the synchronization signal V_TE to switch from the transmitter 210 to the receiver 220 may be one horizontal time (1H).

After the transmission subject of the synchronization signal V_TE is switched from the transmitter 210 to the receiver 220, the receiver 220 may transmit the start pulse PL_STR of the synchronization signal V_TE to the transmitter 210. Accordingly, a vertical back porch period VBP included in a frame period following the frame period including the variable vertical front porch period ΔVFP may be initiated, and the transmitter 210 may transmit the frame data to the receiver 220 through the first interface IF1 during the next frame period. Accordingly, the image data IMG may be quickly updated in response to the touch of the user.

Figure 7:
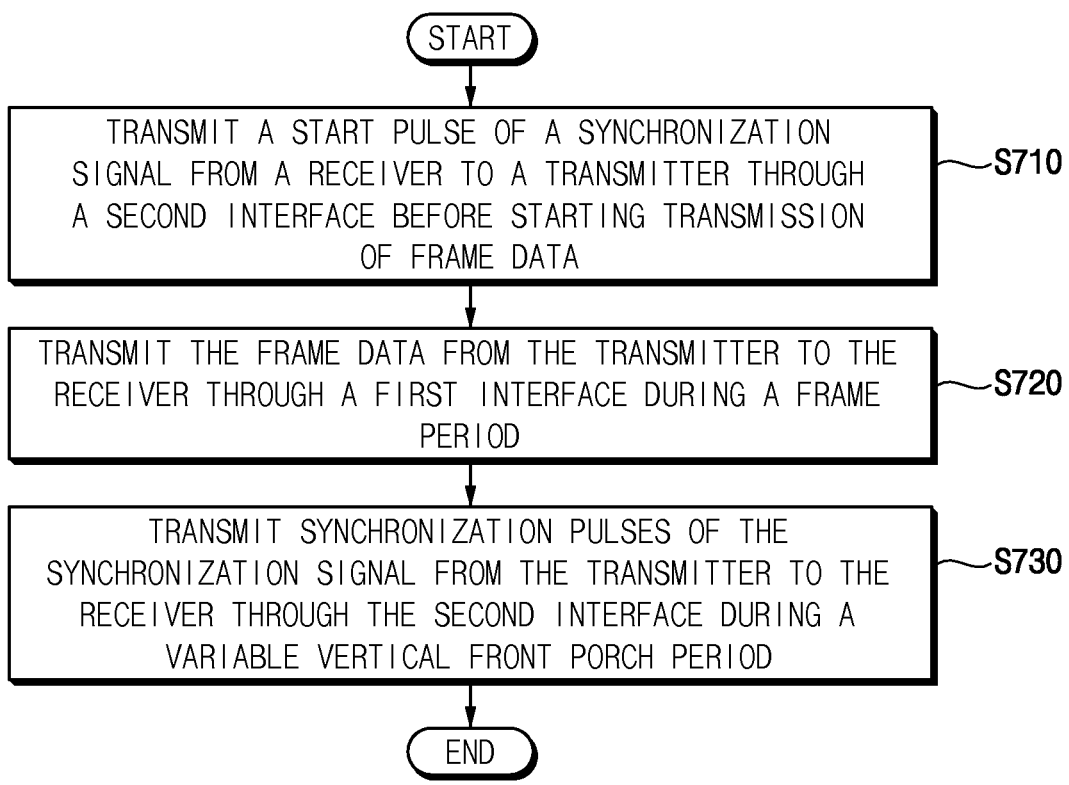
FIG. 7 is a flowchart illustrating a method of driving a transceiver according to an embodiment.

FIG. 7 is a flowchart illustrating a method of driving a transceiver according to an embodiment.

Referring to FIG. 7, in a method of driving the transceiver, the receiver may transmit the start pulse of the synchronization signal to the transmitter through the second interface before starting transmission of the frame data (S710). The receiver may control the period of the start pulse of the synchronization signal by using information related to the frame frequency included in the command packet.

The transmitter may transmit the frame data to the receiver through the first interface during the frame period (S720). The transmitter may transmit the frame data in response to the start pulse of the synchronization signal. The frame data may include an image data packet, a vertical synchronization packet, a horizontal synchronization packet, and a command packet. The transmitter and the receiver may be synchronized by the vertical synchronization signal and the horizontal synchronization signal during the vertical back porch period, the vertical active period, and the vertical front porch period.

The transmitter may transmit the synchronization pulses of the synchronization signal to the receiver through the second interface during the variable vertical front porch period (S730). The transmitter and the receiver may be synchronized by the synchronization pulses of the synchronization signal during the variable vertical front porch period.

In the video mode of MIPI, since the image data is transmitted from the transmitter to the receiver in real time without storing the image data, the transmitter and the receiver may be continuously synchronized. The transmitter and the receiver may be synchronized by the vertical synchronization signal and the horizontal synchronization signal during the vertical back porch period, the vertical active period, and the vertical front porch period, and may be synchronized by the synchronization pulses of the synchronization signal during the variable vertical front porch period, so that the transmitter and the receiver may be continuously synchronized.

The transceiver according to embodiments may be applied to an electronic device such as, for example, a computer, a notebook, a mobile phone, a smartphone, a smart pad, a PMP, a PDA, an MP3 player, or the like.

Referring to a comparative example, in the MIPI protocol, the synchronization signal may not be transmitted from the transmitter to the receiver during the variable vertical front porch period. As a result, in the comparative example, the transmitter and the receiver may not be synchronized during the variable vertical front porch period. In contrast, according to an embodiment of the present disclosure, the transmitter may transmit synchronization pulses of the synchronization signal to the receiver during the variable vertical front porch period. As a result, the transmitter and the receiver may be synchronized.

As is traditional in the field of the present disclosure, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, etc., which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions.

Although electronic devices, transceivers, and drivers according to embodiments have been described with reference to the drawings, it will be understood by those of ordinary skill in the art that various changes in form and detail may be made therein without departing from the spirit and scope of the present disclosure as defined by the following claims.

What is claimed is:

1. A transceiver, comprising:
a transmitter which transmits frame data through a first interface during a frame period including a vertical back porch period, a vertical active period, a vertical front porch period, and a variable vertical front porch period; and
a receiver connected to the transmitter through the first interface and a second interface,
wherein the receiver transmits a start pulse of a synchronization signal to the transmitter through the second interface before starting transmission of the frame data,
wherein the transmitter transmits synchronization pulses of the synchronization signal to the receiver through the second interface during the variable vertical front porch period,
wherein the transmitter transmits a transition pattern of the synchronization signal instead of the synchronization pulses when a touch interrupt occurs during the variable vertical front porch period, and
wherein a transmission subject of the synchronization signal is switched from the transmitter to the receiver in response to the transition pattern.

2. The transceiver of claim 1, wherein the synchronization pulses are transmitted at intervals of one horizontal time.

3. The transceiver of claim 1, wherein the frame data includes a horizontal synchronization packet transmitted during the vertical back porch period, the vertical active period, and the vertical front porch period, and corresponding to a horizontal synchronization signal.

4. The transceiver of claim 3, wherein a transmission subject of the synchronization signal is switched from the receiver to the transmitter when the horizontal synchronization packet is not transmitted during predetermined horizontal times after a start of the variable vertical front porch period.

5. The transceiver of claim 1, wherein the transmitter and the receiver count a number of the synchronization pulses transmitted during the variable vertical front porch period, and
wherein a transmission subject of the synchronization signal is switched from the transmitter to the receiver based on the counted number of the synchronization pulses.

6. The transceiver of claim 1, wherein the transmitter transmits the frame data in response to the start pulse of the synchronization signal.

7. The transceiver of claim 1, wherein the first interface is a Mobile Industry Processor Interface (MIPI), and
wherein the second interface is different from the first interface.

8. An electronic device, comprising:
a host which transmits frame data through a first interface during a frame period including a vertical back porch period, a vertical active period, a vertical front porch period, and a variable vertical front porch period;
a driver connected to the host through the first interface and a second interface, and which transmits image data;
a display device which displays an image based on the image data; and
a touch device connected to the host, and which generates a touch interrupt in response to a touch of a user,
wherein the driver transmits a start pulse of a synchronization signal to the host through the second interface before starting transmission of the frame data,
wherein the host transmits synchronization pulses of the synchronization signal to the driver through the second interface during the variable vertical front porch period,
wherein the host transmits a transition pattern of the synchronization signal instead of the synchronization pulses when the touch interrupt occurs during the variable vertical front porch period, and
wherein a transmission subject of the synchronization signal is switched from the host to the driver in response to the transition pattern.

9. The electronic device of claim 8, wherein the synchronization pulses are transmitted at intervals of one horizontal time.

10. The electronic device of claim 8, wherein the frame data includes a horizontal synchronization packet transmitted during the vertical back porch period, the vertical active period, and the vertical front porch period, and corresponding to a horizontal synchronization signal.

11. The electronic device of claim 10, wherein a transmission subject of the synchronization signal is switched from the driver to the host when the horizontal synchronization packet is not transmitted during predetermined horizontal times after a start of the variable vertical front porch period.

12. The electronic device of claim 8, wherein the host and the driver count a number of the synchronization pulses transmitted during the variable vertical front porch period, and
wherein a transmission subject of the synchronization signal is switched from the host to the driver based on the counted number of the synchronization pulses.

13. The electronic device of claim 8, wherein the host transmits the frame data in response to the start pulse of the synchronization signal.

14. The electronic device of claim 8, wherein the first interface is a Mobile Industry Processor Interface (MIPI), and
wherein the second interface is different from the first interface.

15. The electronic device of claim 8, wherein the display device displays the image during the vertical active period, and does not display the image during the vertical back porch period, the vertical front porch period, and the variable vertical front porch period.

16. The electronic device of claim 15, wherein a length of the variable vertical front porch period increases or decreases in response to a change in a frame frequency of the display device.

17. The electronic device of claim 16, wherein the frame data includes a command packet transmitted during the vertical back porch period and the vertical front porch period, and including information related to the frame frequency.

18. A driver, comprising:
a receiver connected to a transmitter through a first interface and a second interface, and which receives frame data from the transmitter through the first interface during a frame period including a vertical back porch period, a vertical active period, a vertical front porch period, and a variable vertical front porch period, wherein the receiver transmits a start pulse of a synchronization signal to the transmitter through the second interface before starting transmission of the frame data, wherein the receiver receives synchronization pulses of the synchronization signal from the transmitter through the second interface during the variable vertical front porch period, wherein the receiver receives a transition pattern of the synchronization signal instead of the synchronization pulses when a touch interrupt occurs during the variable vertical front porch period, and wherein a transmission subject of the synchronization signal is switched from the transmitter to the receiver in response to the transition pattern.

* * * * *